US011833755B2

(12) United States Patent
Barnhart et al.

(10) Patent No.: US 11,833,755 B2
(45) Date of Patent: Dec. 5, 2023

(54) VATLESS ADDITIVE MANUFACTURING APPARATUS AND METHOD

(71) Applicant: General Electric Company, Schenectady, NY (US)

(72) Inventors: David Richard Barnhart, Jefferson, OH (US); Mary Kathryn Thompson, North Huntingdon, PA (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 17/560,898

(22) Filed: Dec. 23, 2021

(65) Prior Publication Data

US 2022/0111593 A1 Apr. 14, 2022

Related U.S. Application Data

(62) Division of application No. 15/802,351, filed on Nov. 2, 2017, now Pat. No. 11,254,052.

(51) Int. Cl.
*B29C 64/268* (2017.01)
*B29C 64/141* (2017.01)
(Continued)

(52) U.S. Cl.
CPC .......... *B29C 64/268* (2017.08); *B29C 64/141* (2017.08); *B33Y 10/00* (2014.12); *B33Y 30/00* (2014.12)

(58) Field of Classification Search
CPC .............................. B29C 64/141; B33Y 30/00
See application file for complete search history.

(56) References Cited

U.S. PATENT DOCUMENTS

| 4,575,330 A | 3/1986 | Hull |
| 4,752,498 A | 6/1988 | Fudim |

(Continued)

FOREIGN PATENT DOCUMENTS

| CN | 1226198 A | 8/1999 |
| CN | 102371680 A | 3/2012 |

(Continued)

OTHER PUBLICATIONS

EP Patent Application No. 188732885.3 / 3703932 Extended European Search Report dated Jun. 30, 2021.

(Continued)

*Primary Examiner* — Jeffrey M Wollschlager
*Assistant Examiner* — Xue H Liu
(74) *Attorney, Agent, or Firm* — Dinsmore & Shohl LLP

(57) ABSTRACT

An additive manufacturing apparatus includes: a build table, at least a portion of which is transparent, the build table defining a build surface; a material applicator operable to deposit a radio-energy-curable resin on the build surface; a stage positioned facing the build surface of the build table and configured to hold a one or more cured layers of the resin; one or more actuators operable to change the relative positions of the build table and the stage; a radiant energy apparatus positioned adjacent to the build table opposite to the stage, and operable to generate and project radiant energy on the resin through the build table in a predetermined pattern; a drive mechanism operable to move the build table so as to expose a new portion thereof for each layer; and material remover operable to remove remnants from the build surface. A method for using the apparatus is provided.

19 Claims, 9 Drawing Sheets

(51) Int. Cl.
B33Y 30/00 (2015.01)
B33Y 10/00 (2015.01)

(56) References Cited

U.S. PATENT DOCUMENTS

| | | | |
|---|---|---|---|
| 5,026,146 A | 6/1991 | Hug et al. |
| 5,031,120 A | 7/1991 | Pomerantz et al. |
| 5,096,530 A | 3/1992 | Cohen |
| 5,104,592 A | 4/1992 | Hull et al. |
| 5,126,529 A | 6/1992 | Weiss et al. |
| 5,174,931 A | 12/1992 | Almquist |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,258,146 A | 11/1993 | Almquist et al. |
| 5,340,656 A | 8/1994 | Sachs et al. |
| 5,387,380 A | 2/1995 | Cima et al. |
| 5,432,045 A | 7/1995 | Narukawa et al. |
| 5,454,069 A | 9/1995 | Knapp et al. |
| 5,496,682 A | 3/1996 | Quadir et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Satoh et al. |
| 5,807,437 A | 9/1998 | Sachs et al. |
| 5,851,465 A | 12/1998 | Bredt |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson, Jr. et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,896,839 B2 | 5/2005 | Kubo et al. |
| 6,930,144 B2 | 8/2005 | Oriakhi |
| 6,966,960 B2 | 11/2005 | Boyd et al. |
| 6,986,654 B2 | 1/2006 | Imiolek et al. |
| 7,008,209 B2 | 3/2006 | Iskra et al. |
| 7,052,263 B2 | 5/2006 | John |
| 7,087,109 B2 | 8/2006 | Bredt et al. |
| 7,270,528 B2 | 9/2007 | Sherwood |
| 7,300,613 B2 | 11/2007 | Sano et al. |
| 7,455,801 B2 | 11/2008 | Nakashima |
| 7,520,740 B2 | 4/2009 | Wahlstrom et al. |
| 7,550,518 B2 | 6/2009 | Bredt et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 8,003,040 B2 | 8/2011 | El-Siblani |
| 8,071,055 B2 | 12/2011 | Newcombe |
| 8,096,262 B2 | 1/2012 | Ederer et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,211,226 B2 | 7/2012 | Bredt et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,876,513 B2 | 11/2014 | Lim et al. |
| 8,915,728 B2 | 12/2014 | Mironets et al. |
| 8,926,304 B1 | 1/2015 | Chen |
| 8,932,511 B2 | 1/2015 | Napadensky |
| 8,968,625 B2 | 3/2015 | Tan |
| 8,991,211 B1 | 3/2015 | Arlotti et al. |
| 8,998,601 B2 | 4/2015 | Busato |
| 9,067,359 B2 | 6/2015 | Rhoner et al. |
| 9,101,321 B1 | 8/2015 | Kieser |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,233,504 B2 | 1/2016 | Douglas et al. |
| 9,248,600 B2 | 2/2016 | Goodman et al. |
| 9,259,880 B2 | 2/2016 | Chen |
| 9,327,385 B2 | 5/2016 | Webb et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,544 B2 | 8/2016 | Kerekes et al. |
| 9,429,104 B2 | 8/2016 | Fuller |
| 9,434,107 B2 | 9/2016 | Zenere |
| 9,453,142 B2 | 9/2016 | Rolland et al. |
| 9,463,488 B2 | 10/2016 | Elderer et al. |
| 9,469,074 B2 | 10/2016 | Ederer et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakmura |
| 9,539,762 B2 | 1/2017 | Durand et al. |
| 9,545,753 B2 | 1/2017 | Costabeber |
| 9,561,622 B2 | 2/2017 | Das et al. |
| 9,578,695 B2 | 2/2017 | Jerby et al. |
| 9,579,895 B2 | 2/2017 | Okamoto |
| 9,592,635 B2 | 3/2017 | Ebert et al. |
| 9,604,411 B2 | 3/2017 | Rogren |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 2004/0060683 A1 | 4/2004 | Sercombe et al. |
| 2004/0094870 A1 | 5/2004 | Ueno |
| 2008/0169586 A1 | 7/2008 | Hull et al. |
| 2008/0170112 A1 | 7/2008 | Hull et al. |
| 2010/0003619 A1 | 1/2010 | Das et al. |
| 2012/0045617 A1 | 2/2012 | Yasukochi |

(56) References Cited

U.S. PATENT DOCUMENTS

| | | |
|---|---|---|
| 2014/0044824 A1 | 2/2014 | Rohner et al. |
| 2014/0103581 A1 | 4/2014 | Das et al. |
| 2014/0275317 A1 | 9/2014 | Moussa |
| 2015/0102531 A1 | 4/2015 | El-Siblani et al. |
| 2015/0140152 A1 | 5/2015 | Chen |
| 2015/0145174 A1 | 5/2015 | Comb |
| 2015/0224710 A1 | 8/2015 | El-Siblani |
| 2015/0355553 A1 | 12/2015 | Allanic |
| 2016/0031010 A1 | 2/2016 | O'Neill et al. |
| 2016/0046075 A1 | 2/2016 | DeSimone et al. |
| 2016/0096332 A1 | 4/2016 | Chen et al. |
| 2016/0107387 A1 | 4/2016 | Ooba et al. |
| 2016/0129631 A1 | 5/2016 | Chen et al. |
| 2016/0193785 A1 | 7/2016 | Bell et al. |
| 2016/0221262 A1 | 8/2016 | Das et al. |
| 2016/0332386 A1 | 11/2016 | Kuijpers |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0066196 A1 | 3/2017 | Beard et al. |
| 2017/0100895 A1 | 4/2017 | Chou et al. |
| 2017/0100897 A1 | 4/2017 | Chen et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0173865 A1 | 6/2017 | Dikovsky et al. |
| 2017/0173886 A1 | 6/2017 | Menchik et al. |
| 2017/0182708 A1 | 6/2017 | Lin et al. |
| 2017/0190120 A1 | 7/2017 | Bloome et al. |
| 2017/0297108 A1 | 10/2017 | Gibson et al. |
| 2017/0297109 A1 | 10/2017 | Gibson et al. |

FOREIGN PATENT DOCUMENTS

| | | |
|---|---|---|
| CN | 102688829 A | 9/2012 |
| CN | 103568323 A | 2/2014 |
| JP | 2013543801 A | 12/2013 |
| JP | 2017030368 A | 2/2017 |
| KR | 101155684 B1 | 6/2012 |
| KR | 101548220 B1 | 8/2015 |
| WO | 9806560 A1 | 2/1998 |
| WO | 2006077665 A1 | 7/2006 |
| WO | 2017009368 A1 | 1/2017 |

OTHER PUBLICATIONS

CN Patent Application No. 201880070332.3 First Office Action dated Jun. 28, 2021.

PCT Publication No. 2019-089496A1 International Search Report, dated Feb. 20, 2019.

Japanese Patent Application No. 2020-524745, Notice of Reasons for Refusal Office Action, dated Apr. 19, 2021.

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachines, Article May 11, 2017, Micromachines, Seoul University, Seoul, Korea.

VATLESS ADDITIVE MANUFACTURING APPARATUS AND METHOD

CROSS REFERENCE TO RELATED APPLICATIONS

This application is a divisional application of U.S. patent application Ser. No. 15/802,351, filed Nov. 2, 2017, the content of which is hereby incorporated by reference in its entirety.

BACKGROUND OF THE INVENTION

This invention relates generally to additive manufacturing, and more particularly to methods for curable material handling in additive manufacturing.

Additive manufacturing is a process in which material is built up piece-by-piece, line-by-line, or layer-by-layer to form a component. Stereolithography is a type of additive manufacturing process which employs a vat of liquid radiant-energy curable photopolymer "resin" and a curing energy source such as a laser. Similarly, DLP 3-D printing employs a two-dimensional image projector, e.g. analog (masked light source) or digital (DLP or steerable mirror devices with light source), to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer.

In curing the photopolymer resin, it is preferable to have a fresh supply of material for each layer. Old resin may contain cured products such as supports that are broken off of the part or other external contamination. In a vat-based process, this contamination or the contaminated material can cure into the component, resulting in undesirable geometry, or otherwise disrupt the build process and damage the final part.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional resin. One problem with tape casting is that it is wasteful because the tape is often not reusable.

BRIEF DESCRIPTION OF THE INVENTION

At least one of these problems is addressed by an additive manufacturing method in which material is deposited and cured on a rigid plate which is moved to present a fresh surface between curing cycles.

According to one aspect of the technology described herein, an additive manufacturing apparatus includes: a build table, at least a portion of which is transparent, the build table defining a build surface; a material applicator operable to deposit a radio-energy-curable resin on the build surface; a stage positioned facing the build surface of the build table and configured to hold a stacked arrangement of one or more cured layers of the resin; one or more actuators operable to change the relative positions of the build table and the stage; a radiant energy apparatus positioned adjacent to the build table opposite to the stage, and operable to generate and project radiant energy on the resin through the build table in a predetermined pattern; a drive mechanism operable to move the build table so as to expose a new portion thereof for each layer; and a material remover operable to remove remnants from the build surface.

According to another aspect of the technology described herein, an additive manufacturing apparatus includes: a build table mounted for rotation about a central axis, wherein at least a portion of the build table is transparent, and build table defines a build surface; a drive mechanism configured to selectively rotate the build table about the central axis; a material applicator operable to deposit a radio-energy-curable resin on the build surface; a stage positioned facing the build surface of the build table and configured to hold a stacked arrangement of one or more cured layers of the resin; one or more actuators operable to change the relative positions of the build table and the stage; a radiant energy apparatus positioned adjacent to the build table opposite to the stage, and operable to generate and project radiant energy on the resin through the build table in a predetermined pattern; a drive mechanism operable to move the build table so as to expose a new portion thereof for each layer; and a material remover operable to remove remnants from the build surface.

According to another aspect of the technology described herein, a method for producing a component layer-by-layer includes the steps of: applying a radiant-energy radio-energy-curable resin on a build surface of a build table which includes at least a portion which is transparent; positioning a stage at a predetermined distance from the build surface so as to define a layer increment in the resin; selectively curing the resin within a build zone on the build surface, using an application of radiant energy in a specific pattern so as to define the geometry of a cross-sectional layer of the component; moving the build table and the stage relatively apart so as to separate the component from the build surface; advancing the build table so as to expose a new portion thereof; using a material remover to remove remnants from the build surface at a location downstream of the build zone; and repeating the steps of applying, positioning, selectively curing, moving, advancing, and removing for a plurality of layers until the component is complete.

BRIEF DESCRIPTION OF THE DRAWINGS

The invention may be best understood by reference to the following description taken in conjunction with the accompanying drawing figures in which.

DETAILED DESCRIPTION OF THE INVENTION

The concept disclosed herein presents an additive manufacturing method and related apparatus in which curable material is deposited and cured on a generally stiff build surface that is spatially continuous beyond the boundaries of a build zone where the curing takes place. The apparatus is configured so as to move a clean portion of the build surface into the build zone when a particular curing cycle is completed. The method and apparatus include embodiments in which the material deposition and/or removal of excess uncured material is physically driven by movement of the build surface, and other embodiments in which material deposition and/or removal is carried out by independent means.

Figure 2:
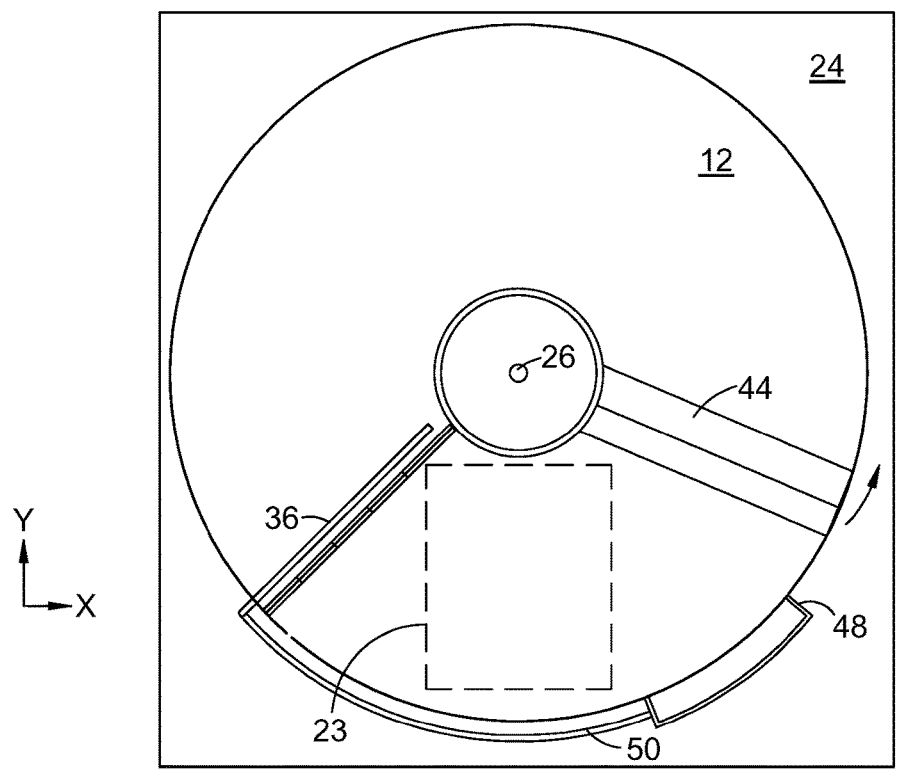
FIG. 2 is a schematic top plan view of the apparatus of FIG. 1.
Figure 1:
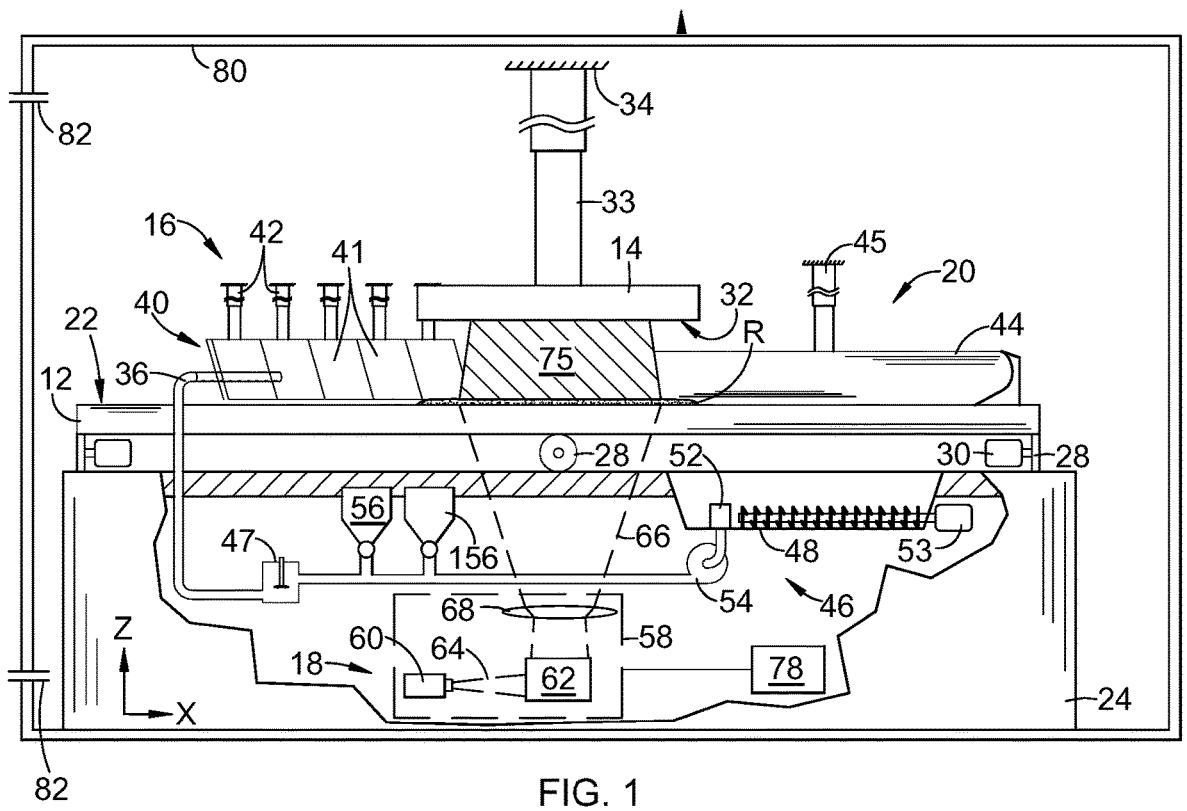
FIG. 1 is a schematic side elevation view of an exemplary additive manufacturing apparatus.

Referring to the drawings wherein identical reference numerals denote the same elements throughout the various views, FIGS. 1 and 2 illustrate schematically an example of one type of suitable apparatus 10 for carrying out an additive manufacturing method in which material deposition and/or removal is physically driven by movement of a build table. As will be explained in more detail below, it will be understood that other configurations of equipment may be used to carry out the method described herein. Basic components of the exemplary apparatus 10 include a build table 12, a stage 14, a material applicator 16, a radiant energy apparatus 18, and a material remover 20. Each of these components will be described in more detail below.

The build table 12 is a structure defining a planar build surface 22. For purposes of convenient description, the build surface 22 may be considered to be oriented parallel to an X-Y plane of the apparatus 10, and a direction perpendicular to the X-Y plane is denoted as a Z-direction (X, Y, and Z being three mutually perpendicular directions).

The build table 12 is sufficiently stiff such that, under the expected loads applied during an additive manufacturing process, it does not bend or deflect enough to interfere with the additive manufacturing process, or cause an unacceptable amount of distortion or inaccuracy in the component being produced. The desired stiffness may be provided through a combination of material properties (i.e. a sufficiently high modulus) and/or component design (i.e. thickness, stiffening features, etc.).

The build table 12, or selected portions of it, are transparent. As used herein, "transparent" refers to a material which allows radiant energy of a selected wavelength to pass through. For example, as described below, the radiant energy used for curing could be ultraviolet light or laser light in the visible spectrum. Nonlimiting examples of transparent materials include polymers, glass, and crystalline minerals such as sapphire or quartz. The build table 12 could be made up of two or more subcomponents, some of which are transparent.

As illustrated, the build table 12 is disk-shaped to allow continuous movement within the apparatus 10, as explained in more detail below. However, it should be appreciated that the build table 12 may define other closed or open path shapes in other forms such as annular rings, straight lines, curves and/or polygons. Furthermore, these shapes may include non-uniform features such as a varying width, or the inclusion of features (notches, slots, grooves, etc.) to facilitate locating or actuating the build table 12.

Means are provided for moving the build table 12 along a predetermined path. The path may be open or closed. For example, the path may be a line or an open or closed curve. In the illustrated example, the build table 12 is supported on a base 24 such that it can rotate about central axis 26. Support is provided by a plurality of support rollers 28 between the base 24 and the build table 12. A drive mechanism is provided in the form of a motor (such as an electric stepper motor) 30 coupled to one or more of the support rollers 28. Other mounting and drive systems are possible; the mounting and drive system would be selected as appropriate for the chosen build table shape and path shape.

The build surface 22 may be configured to be "non-stick", that is, resistant to adhesion of cured resin. The non-stick properties may be embodied by a combination of variables such as the chemistry of the build table 12, its surface finish, and/or applied coatings. In one example, a permanent or semi-permanent non-stick coating may be applied. One nonlimiting example of a suitable coating is polytetrafluoroethylene ("PTFE"). In one example, all or a portion of the build surface 22 may incorporate a controlled roughness or surface texture (e.g. protrusions, dimples, grooves, ridges, etc.) with nonstick properties. In one example, the build surface 22 may be overlaid with a flexible layer of silicone material. In one example, the build table 12 may be made from an oxygen-permeable material.

The apparatus defines a "build zone" 23 which is described in more detail below. While only one build zone 23 is illustrated, it will be understood that multiple build zones may be provided, each with its own associated build apparatus such as the material applicator, material remover, radiant energy apparatus, etc., as described below.

The stage 14 is a structure defining a planar upper surface 32 which is oriented parallel to the build surface 22.

Some means are provided for causing relative movement of the stage 14 and the build table 12 relative to each other in the Z-direction. In FIG. 1, these means are depicted schematically as a simple actuator 33 connected between the stage 14 and a stationary support structure 34, with the understanding devices such as pneumatic cylinders, hydraulic cylinders, ballscrew electric actuators, linear electric actuators, or delta drives may be used for this purpose. In addition to or as an alternative to making the stage 14 movable, the build table 12 could be movable parallel to the Z-direction.

The material applicator 16 may be any device or combination of devices which is operable to apply a layer of resin R over the build table 12 and to level the resin R.

Figure 3:
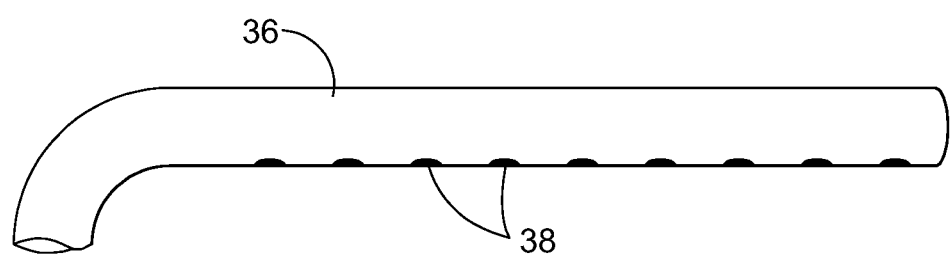
FIG. 3 is an enlarged view of a portion of FIG. 1, showing a portion of a material applicator of the apparatus.

In the example shown in FIG. 1, the material applicator 16 includes a hollow tube 36 including a plurality of spaced-apart nozzle holes 38 (see FIG. 3). In use, resin R optionally including a filler would be pumped into the interior of the tube 36 and discharged onto the build surface 22 through the nozzle holes 38 upstream of the build zone 23.

Means are provided for leveling the applied resin R. In the example shown in FIG. 1, the material applicator 16 includes a recoater 40 which is a rigid, laterally-elongated structure positioned downstream of the tube 36. The recoater 40 is spaced a predetermined vertical distance from the build surface 22, thus defining a layer increment. This may be rigidly fixed in place, or it may be connected to a separate actuator 42 (FIG. 1) in order to enable a variable layer thickness. The actuator 42 may be configured for purely vertical movement or may be configured for controlled tilting of the recoater 40 about one or more axes. In the illustrated example, the recoater 40 comprises a plurality of individual side-by-side sections 41, each with its own actuator 42. The height of the individual sections 41 may be varied as desired to produce variations in the layer thickness across the width of the build table 12, or to compensate for variations in the layer thickness across the width of the build table 12.

The material remover 20 may be any device or combination of devices which is effective to remove uncured resin R and other remnants from the build surface 22. Nonlimiting examples of suitable cleaning devices include scrapers, brushes, suction or blowing mechanisms, absorbent or sponge-like devices, solvent rinsing equipment, or combinations thereof.

In the example shown in FIG. 1, the material remover 20 is configured as a scraper 44 which is a stiff, laterally-elongated structure. The scraper 44 is static and functions by scraping material off the build table 12 and into a trough (described below), as the build table 12 rotates underneath it. The scraper 44 may be oriented at an angle to the radial direction to encourage material to move radially off the build table 12. The scraper 44 may be coupled to an actuator 45 to permit its height or pressure against the build table 12 to be adjusted. Optionally, the scraper 44 may be made substantially wider than the material applicator 16, such that uncured material may be laid down and picked up without any material flowing over the sides of the build table 12. Depending on the properties of the build table 12, the material remover 20 may instead be configured as a flexible squeegee-type device instead of a stiff scraper.

Figure 5:
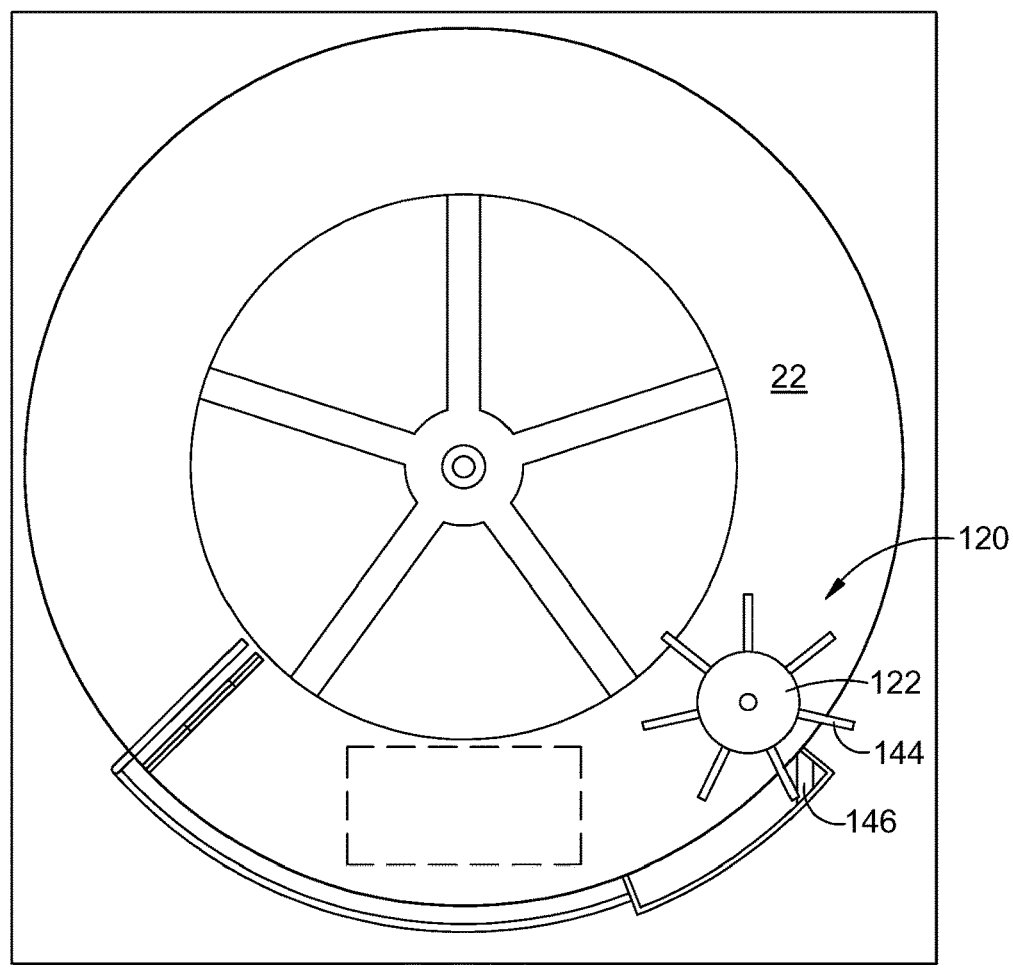
FIG. 5 is a schematic top plan view of the material remover shown in FIG. 4.
Figure 4:
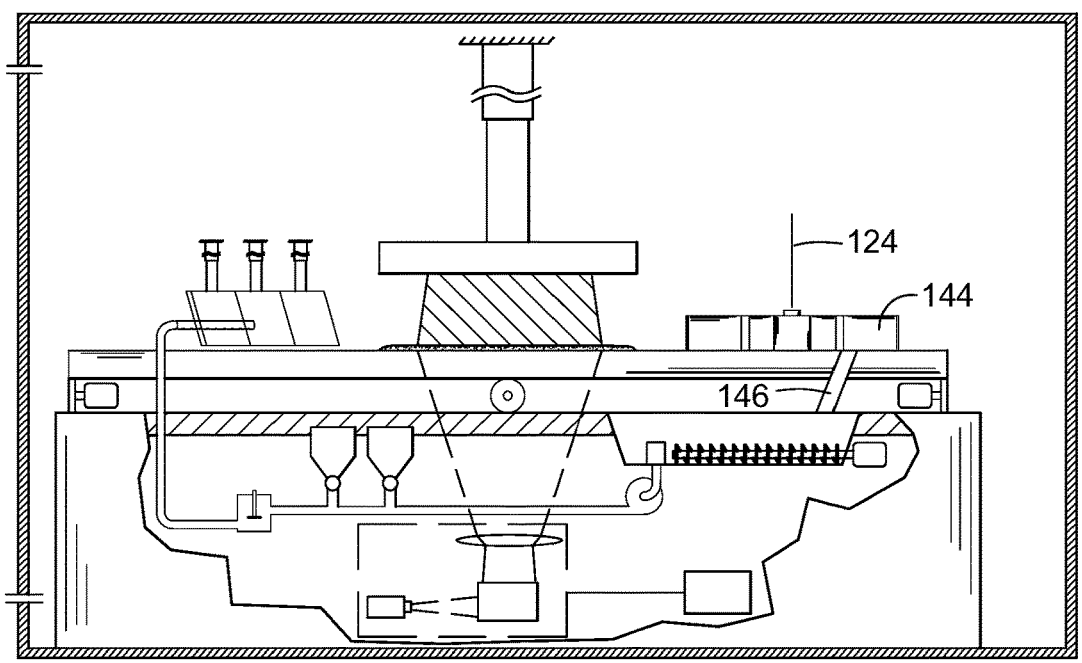
FIG. 4 is a schematic side elevation view of an alternative material remover.

Alternatively, the material remover could be an active device, with some type of blade or other material-engaging element movable using one or more actuators in a path causing the material-engaging element to move material off the build surface 22. For example, FIGS. 4 and 5 illustrate a material remover 120 comprising a drum 122 mounted above the build surface 22 for rotation about a vertical axis 124. The drum 122 carries a plurality of scraper blades 144 which are positioned to engage the build surface 22. In operation, the drum 122 would be rotated by a motor (not shown). As the drum 122 rotates, the scraper blades 144 would scrape uncured resin R off of the build table 12. This material would then fall off the side of the build table 12 for disposal or recovery. A squeegee 146 may be provided to scrape the material from the bottom edge of the scraper blades 144 optionally, a blower (not shown may be used to help remove material from the scraper blades 144).

Referring back to FIGS. 1 and 2, a material circulating apparatus 46 may be provided. In the illustrated example, this apparatus includes a recovery trough 48 positioned beneath the build table 12 and the scraper 44. In operation, material scraped off the build surface 22 falls into the trough 48. The trough 48 is connected to the material applicator 16 by appropriate piping or another suitable conduit 50. A filter or screen 52 may be provided to remove pieces of partially-cured resin R and other remnants from the stream of material. A pumping element 54 may be provided to move material through the circulating apparatus 46. Additionally, or as an alternative to the pumping element, one or more devices such an auger 53 (here shown in the bottom of the trough 48) may be used to move material in the apparatus. Augers may be especially helpful for moving viscous material. New resin R and/or filler may be introduced into the stream of material from a reservoir 56. Means may be provided for mixing the resin R to ensure the material is homogenous (including for example, any or all of: new resin R, used resin R, new filler, used filler). A schematic mixer 47 is shown in FIG. 1 which may be used to mix or agitate the material before deposition.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 58, used herein generally to refer to any device operable to generate a radiant energy patterned image of suitable energy level and other operating characteristics to cure the resin R. As used herein, the term "patterned image" refers to a projection of radiant energy comprising an array of individual pixels. Nonlimiting examples of patterned imaged devices include a DLP projector or another digital micromirror device, a 2D array of LEDs, a 2D array of lasers, or optically addressed light valves. In the illustrated example, the projector 58 comprises a radiant energy source 60 such as a UV lamp, an image forming apparatus 62 operable to receive a source beam 64 from the radiant energy source 60 and generate a patterned image 66 to be projected onto the surface of the resin R, and optionally focusing optics 68, such as one or more lenses.

The radiant energy source 60 may comprise any device operable to generate a beam of suitable energy level and frequency characteristics to cure the resin R. In the illustrated example, the radiant energy source 60 comprises a UV flash lamp.

The image forming apparatus 62 may include one or more light-manipulating elements such as mirrors, prisms, optical filters, splitters, optical fibers, photo-optical sensors, and/or lenses and is provided with suitable actuators, and arranged so that the source beam 64 from the radiant energy source 60 can be transformed into a pixelated image in an X-Y plane coincident with the surface of the resin R. In the illustrated example, the image forming apparatus 62 may be a digital micromirror device. For example, the projector 58 may be a commercially-available Digital Light Processing ("DLP") projector.

As an option, the projector 58 may incorporate additional means such as actuators, mirrors, etc. configured to selectively move the image forming apparatus 62 or other part of the projector 58, with the effect of rastering or shifting the location of the patterned image 66. Stated another way, the patterned image may be moved away from a nominal or starting location. This permits a single image forming apparatus 62 to cover a larger build area, for example. Means for mastering or shifting the patterned image from the image forming apparatus 62 are commercially available. This type of image projection may be referred to herein as a "tiled image".

Figure 6:
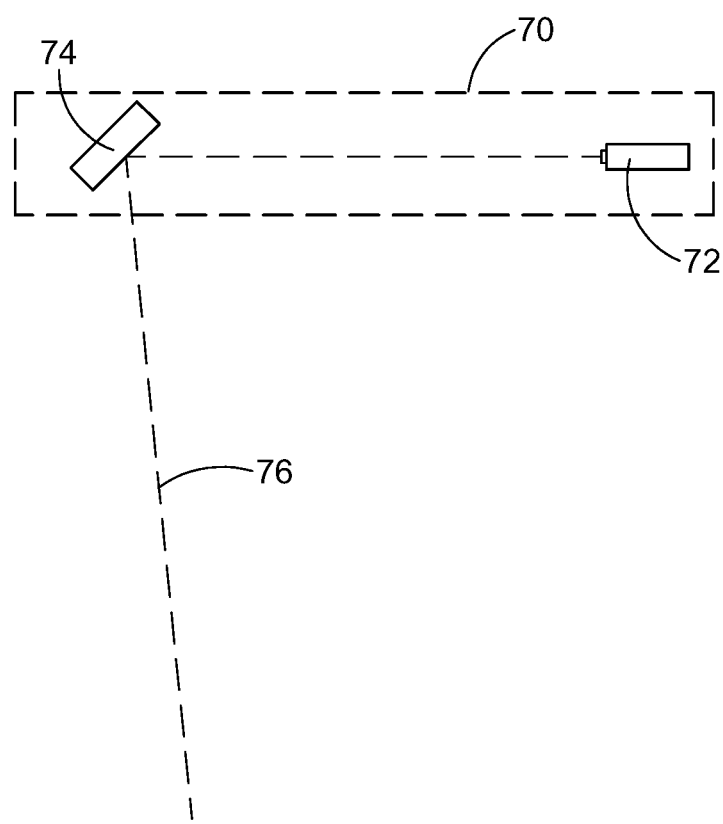
FIG. 6 is a schematic side view of a beam scanning apparatus for use with the apparatus of FIG. 1.

Alternatively, the radiant energy apparatus 18 may comprise a "scanned beam apparatus" used herein to refer generally to refer to any device operable to generate a radiant energy beam of suitable energy level and other operating characteristics to cure the resin R and to scan the beam over the surface of the resin R in a desired pattern. FIG. 6 shows an example of a scanned beam apparatus 70 comprising a radiant energy source 72 and a beam steering apparatus 74.

The radiant energy source 72 may comprise any device operable to generate a beam of suitable power and other operating characteristics to cure the resin R. Nonlimiting examples of suitable radiant energy sources include lasers or electron beam guns.

The beam steering apparatus 74 may include one or more mirrors, prisms, and/or lenses and may be provided with suitable actuators, and arranged so that a beam 76 from the radiant energy source 72 can be focused to a desired spot size and steered to a desired position in plane coincident with the surface of the resin R. The beam 76 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 78. The controller 78 in FIG. 1 is a generalized representation of the hardware and software required to control the operation of the apparatus 10, including some or all of the material applicator 16, the stage 14, the radiant energy apparatus 18, the material remover 20, and the various actuators described above. The controller 78 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 80, which may be used to provide a shielding or inert gas atmosphere using gas ports 82. Optionally, the housing 80 could be temperature and/or humidity controlled. Optionally, ventilation of the housing 80 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form.

Generally, the resin R should be flowable so that it can be leveled between the build table 12 and the build surface 22. A suitable resin R will be a material that is relatively thick, i.e. its viscosity should be sufficient that it will not run off of the build table 12 during the curing process. The composition of the resin R may be selected as desired to suit a particular application. Mixtures of different compositions may be used.

The resin R may be selected to have the ability to out-gas or burn off during further processing, such as a sintering process.

The resin R may incorporate a filler. The filler may be pre-mixed with resin R, then loaded into the material applicator 16. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Mixtures of different compositions may be used.

The filler may be "fusible", meaning it is capable of consolidation into a mass upon via application of sufficient energy. For example, fusibility is a characteristic of many available polymeric, ceramic, and metallic powders.

The proportion of filler to resin R may be selected to suit a particular application. Generally, any amount of filler may be used so long as the combined material is capable of flowing and being leveled, and there is sufficient resin R to hold together the particles of the filler in the cured state. The mixture of resin R and filler may be referred to as a "slurry".

Examples of the operation of the apparatus 10 will now be described in detail. It will be understood that, as a precursor to producing a component and using the apparatus 10, the component 75 is software modeled as a stack of planar layers arrayed along the Z-axis. Depending on the type of curing method used, each layer may be divided into a grid of pixels. The actual component 75 may be modeled and/or manufactured as a stack of dozens or hundreds of layers. Suitable software modeling processes are known in the art.

Optionally, the build process may begin by applying a nonstick material to the build surface 22 prior to resin application. For example, a release agent such as polyvinyl alcohol ("PVA") may be applied to the build surface 22 prior to each layer being built.

Optionally, to prevent sticking, some means could be provided to supply oxygen through the thickness of the build table 12, in order to inhibit curing of the resin R immediately adjacent the build surface 22 (oxygen can inhibit the curing of UV-curable resins).

The material applicator 16 is used to apply resin R to the build surface 22. In the illustrated example, resin R flows out the nozzle holes 38 and onto the build table 12. As the build table 12 rotates, it pulls the applied material underneath the recoater 40 which levels the applied material to a desired thickness. The multiple sections 41 described above may be used to intentionally apply a layer having a varying thickness across the width of the build surface 22, if desired. Alternatively, the multiple sections 41 (or the actuator 42 configured to provide a pivoting movement) may be used to compensate for any variation from a desired uniform layer thickness. Such non-uniformity might be caused by factors such as varying surface speed across the width of the build surface 22, variations in the resin viscosity, etc. This compensation could be carried out, for example, by positioning the recoater 40 at an acute angle (e.g. not parallel) to the build surface, so that the recoater 40 is closer to the build surface 22 at locations where variations would tend to produce an excessive resin layer thickness. The result would be a uniform layer thickness.

If excess material is applied, it is possible to provide one or more side scrapers or additional catch troughs (not shown) to recover the material. This may then be drained or pumped away, or removed manually.

Figure 7:
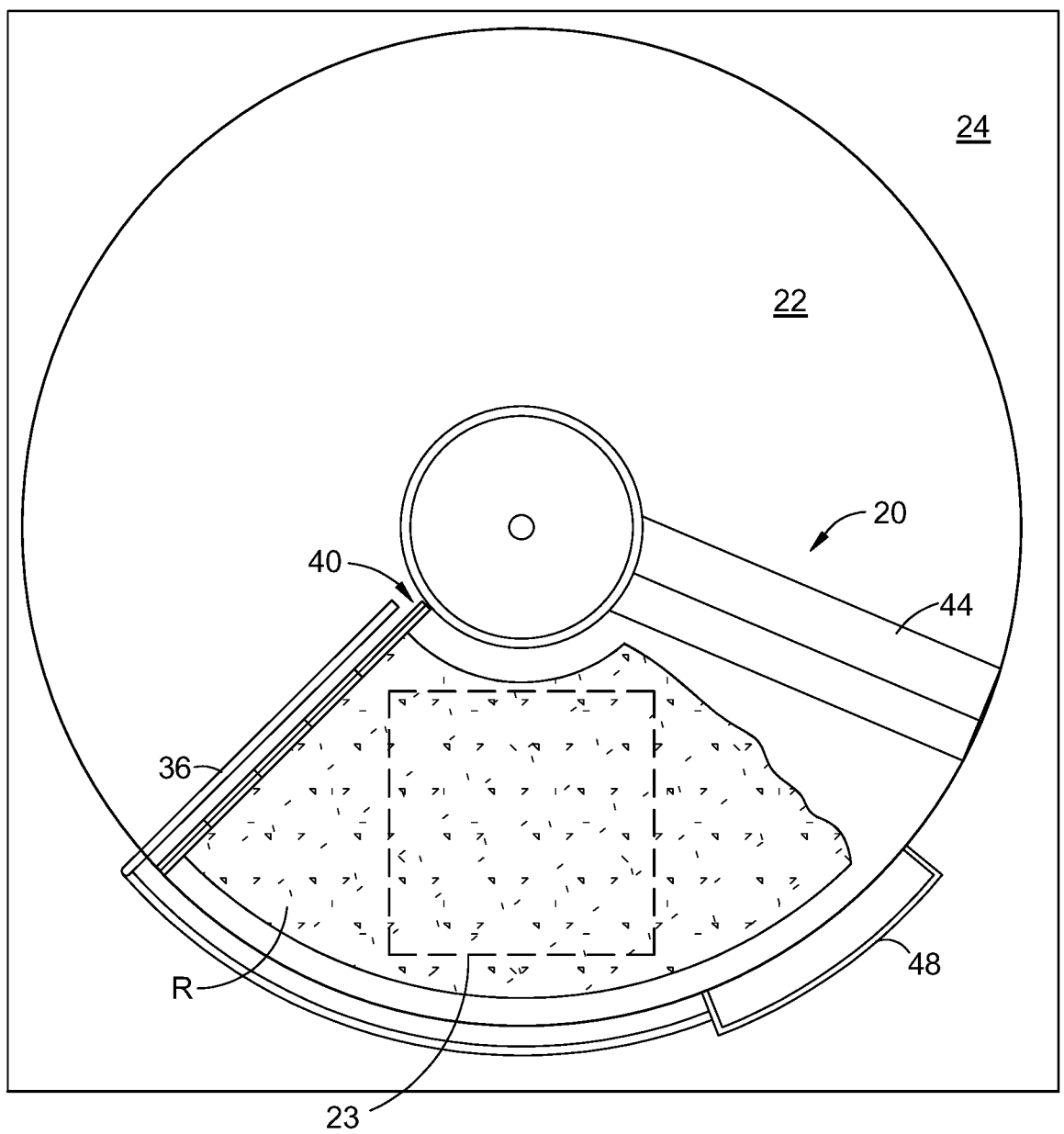
FIG. 7 is a top plan of the apparatus of FIG. 1, showing resin being deposited onto a build table thereof

Optionally to reduce the chance of applying excess material, the width of the resin layer which is applied may be substantially narrower than the build table 12, so that there is a lateral margin on each side and no material flows over the sides. For example, as shown in FIG. 7, the width of the band of resin R is narrower than the build table 12.

Depending on the specific application, it is possible that there will be either an excess build up or an inconsistent layer during a transition, i.e. when the motion of the build table 12 starts or stops. If such transitions areas are present, it would be helpful for part uniformity that the build zone 23 not coincide with these transition areas. The size of the transition areas (if present) is likely to be fairly constant. It is possible to avoid these transition areas either by making the minimum advance of the build table 12 (i.e. number of degrees rotated) greater than the size of the transition area plus the size of the desired build zone 23 for one component, or to rotate the build table 12 a relatively large amount between layers, providing a large zone that is guaranteed to have a uniform slurry height. To avoid waste of material in this case, it is possible to manufacture several closely-spaced components in the zone between the material applicator 16 and the material remover 20.

Optionally, different layers may comprise two or more different material combinations of resin R and/or filler. As used herein, the term "combination" refers to any difference in either of the constituents. So, for example, a particular resin composition mixed with two different filler compositions would represent two different material combinations. For example, one layer may comprise a first combination of resin R and filler, and a second layer may comprise a different combination of resin R and filler. The different materials may be provided, for example, by providing one or more additional supply containers 156, as seen in FIG. 1.

After the material is deposited, the apparatus 10 is positioned to define a selected layer increment. The layer increment is defined by some combination of the thickness that the resin R is applied by the material applicator 16 and the operation of the stage 14. For example, the stage 14 could be positioned such that the upper surface 32 is just touching the applied resin R, or the stage 14 could be used to compress and displace the resin R to positively define the layer increment. The layer increment affects the speed of the additive manufacturing process and the resolution of the component 75. The layer increment can be variable, with a larger layer increment being used to speed the process in portions of a component 75 not requiring high accuracy, and a smaller layer increment being used where higher accuracy is required, at the expense of process speed.

Once the resin R with filler has been applied and the layer increment defined, the radiant energy apparatus 18 is used to cure a two-dimensional cross-section or layer of the component 75 being built.

Where a projector 58 is used, the projector 58 projects a patterned image 66 representative of the cross-section of the component 75 through the build table 12 to the resin R. Exposure to the radiant energy cures and solidifies the pattern in the resin R. This type of curing is referred to herein as "selective" curing.

Once curing of the first layer is complete, the stage 14 is separated from the build table 12, for example by raising the stage 14 using the actuator 33.

Figure 12:
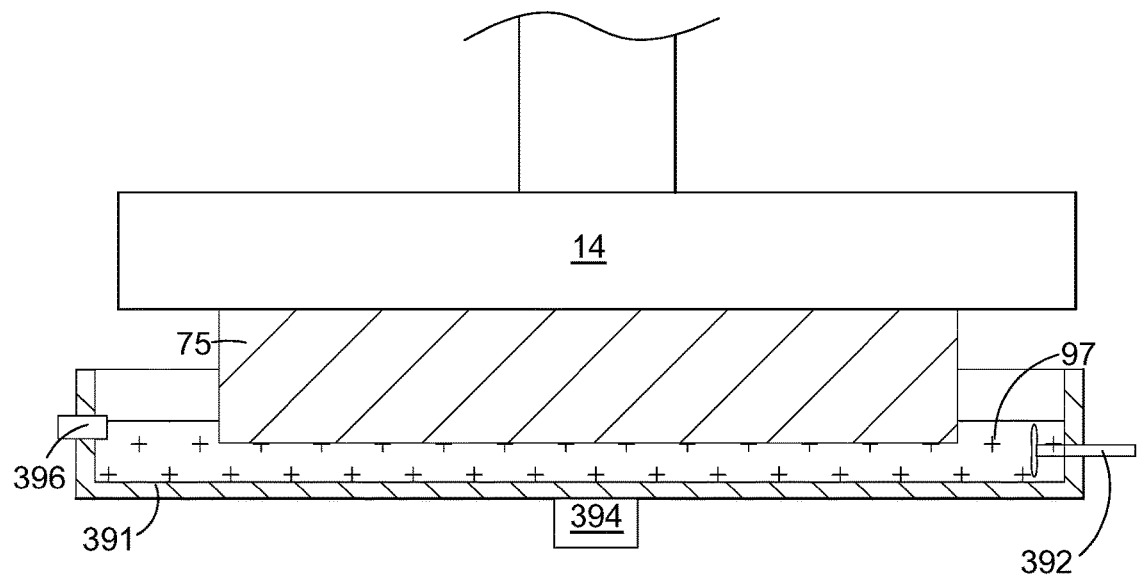
FIG. 12 is a schematic side elevation view of a stage and a vat containing cleaning fluid.
Figure 13:
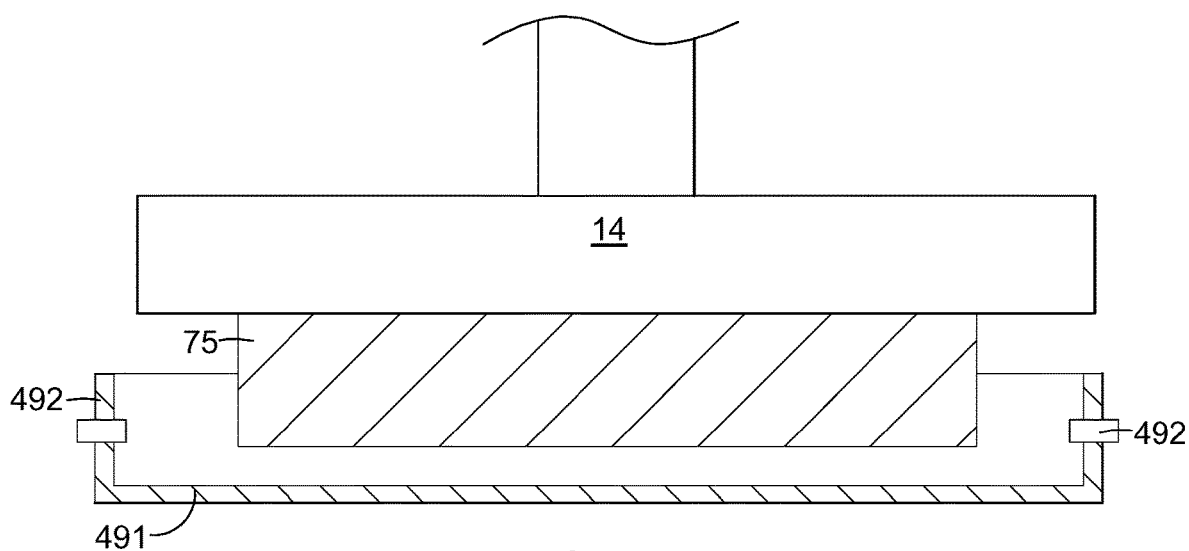
FIG. 13 is a schematic side elevation view of a stage in an empty vat equipped with air nozzles.

Optionally, the component 75 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 75 and/or the stage 14 to ensure that no additional material or material contamination is present in the final component 75. For example, cleaning could be done by contacting the component 75 and/or the stage 14 with a cleaning fluid such as a liquid detergent or solvent. FIG. 12 shows one example of how this could be accomplished by providing a cleaning vat 391 containing the cleaning fluid. The cleaning vat 391 comprises a floor surrounded by a peripheral wall. In use, the cleaning fluid 97 would be placed in the cleaning vat 391. A suitable mechanism (not shown) would be used to move the cleaning vat 391 into position under the stage 14. The stage 14 would then be lowered to bring the component 75 into contact with the cleaning fluid 97. Upon completion of the cleaning cycle, the stage 14 would then be raised to move the component 75 clear of the cleaning vat 391. FIG. 12 illustrates several different possible means for producing this relative motion. As one example, a mechanical mixing blade 392 may be used to agitate the cleaning fluid 97. As another example, an ultrasonic transducer 394 coupled to the cleaning vat 391 may be used to produce ultrasonic waves in the cleaning fluid 97. As another example, one or more nozzles 396 may be used to introduce jets of flowing cleaning fluid 97. As yet another example, appropriate actuators (not shown) may be used to produce relative motion of the stage 14 and the cleaning vat 391. Optionally, the cleaning process may include a "drying" step in which the freshly cleaned component 75 is positioned within an empty cleaning vat 491 (FIG. 13) with air nozzles 492 which would be used to direct jets of air at the component 75 for the purpose of blowing off or evaporating the cleaning fluid. Depending on the particular circumstances, the "drying" step may be sufficient to clean the component 75 in and of itself. Subsequent to the cleaning step, the cleaning vat would be moved away from the stage 14.

The build table 12 is then advanced to move the build surface 22 under the material remover 20, thus removing any excess cured or uncured resin R, filler, release agent, or other remnants. The excess uncured resin R and filler flows into the catch trough 48 and is recycled as described above.

Concurrent with the step of removing or cleaning remnants from the build surface 22, additional resin R with filler is applied to the clean portion of the build surface 22, which is exposed by rotation of the build table 12. Another layer increment is defined, and the projector 58 again projects a patterned image 66. Exposure to the radiant energy selectively cures resin R as described above, and joins the new layer to the previously-cured layer above. This cycle of applying resin R, incrementing a layer, and then selectively curing is repeated until the entire component 75 is complete.

Where a scanned beam apparatus is used instead of a projector, the build process is similar except for the curing step. To carry out the curing, the radiant energy source 68 emits a beam 66 and the beam steering apparatus 70 is used to cure the resin R by steering a focal spot of the build beam 66 over the exposed resin R in an appropriate pattern.

Either curing method (projector or scanned) results in a component 75 in which the filler (if used) is held in a solid shape by the cured resin R. This component may be usable as an end product for some conditions. Subsequent to the curing step, the component 75 may be removed from the stage 14.

If the end product is intended to be purely ceramic or metallic, the component 75 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

In the method described above, the material application and the material removal are physically linked to, and driven by, the movement of the build table 12. Alternatively, an additive manufacturing method may be carried out in which the material application and/or the material removal are independent of movement of the build table 12. This alternative method may be carried out using the apparatus 10, or suitable modifications thereof.

Figure 8:
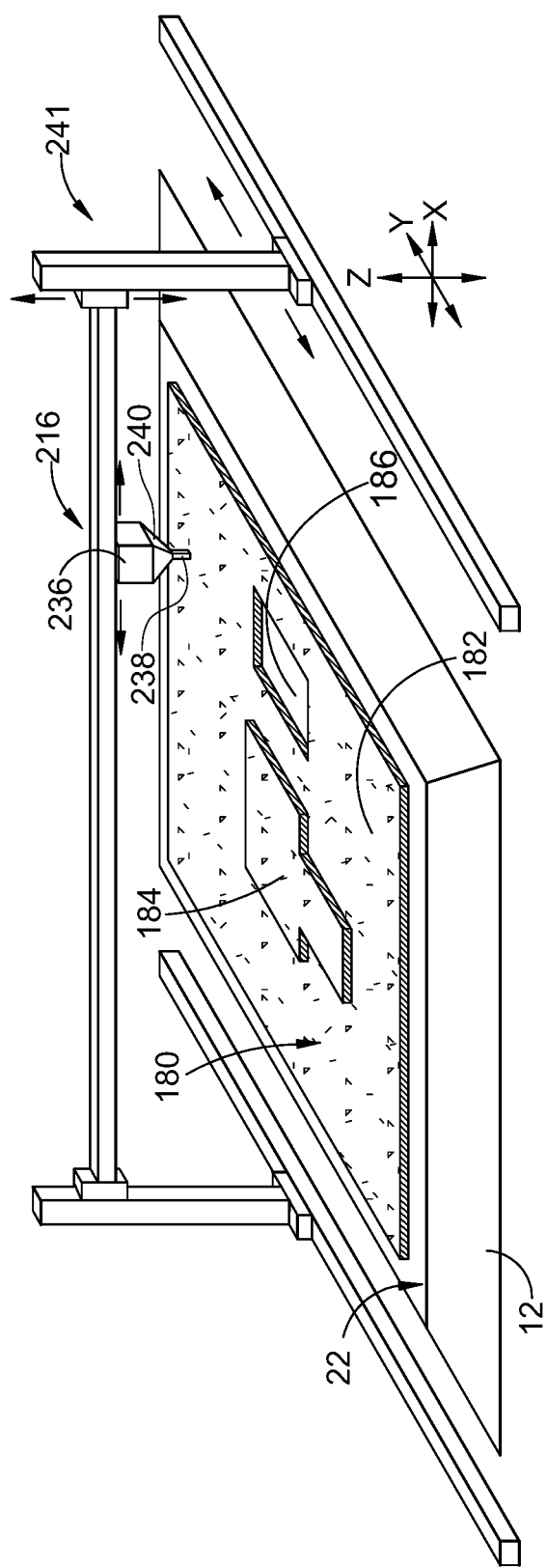
FIG. 8 is a schematic perspective view of an exemplary material applicator suitable for use with the apparatus of FIG. 1.

For example, a material applicator which does not require build table movement may be substituted for the material applicator 16. FIG. 8 illustrates an example of a suitable type of material applicator 216 comprising a supply container 236 with a nozzle 238 and a flow control mechanism 240. Appropriate means are provided for controlled 3D movement of the material applicator 216 over the build surface 22 (e.g. in X, Y, Z axes). FIG. 12 shows an actuator assembly 241 as an example. This type of material applicator 216 is capable of depositing resin R in layers having arbitrary shapes and variable thickness. In the example shown in FIG. 8, an exemplary layer 180 has some areas (exemplified by section 182) having a relatively smaller thickness and other areas (exemplified by section 184) having relatively larger thickness. The layer 180 may also include areas devoid of material (exemplified by open area 186). The shape of the various sections of layer may be arbitrary, as exemplified by the raised section 184.

Nonlimiting examples of other suitable resin application devices that do not require build table rotation include chutes, hoppers, pumps, spray nozzles, spray bars, or printheads (e.g. inkjets).

Once the resin is applied to the build surface 22, the apparatus 10 is used to carry out the build step described above, including positioning to define a selected layer increment, using the radiant energy apparatus to cure a two-dimensional cross-section or layer of the component 75 being built, and separating the stage from the build table 12.

The build table 12 is then advanced to move a new, clean portion of the build surface 22 into the build zone 23, thus readying the apparatus for a subsequent layer.

Concurrently or subsequently to advancing the build table 12, a material remover is used to remove any excess cured or uncured resin R, filler, release agent, or other remnants from the build surface 22. It will be understood that the material remover can be located anywhere in the apparatus 10 downstream of the build zone 23.

Figure 9:
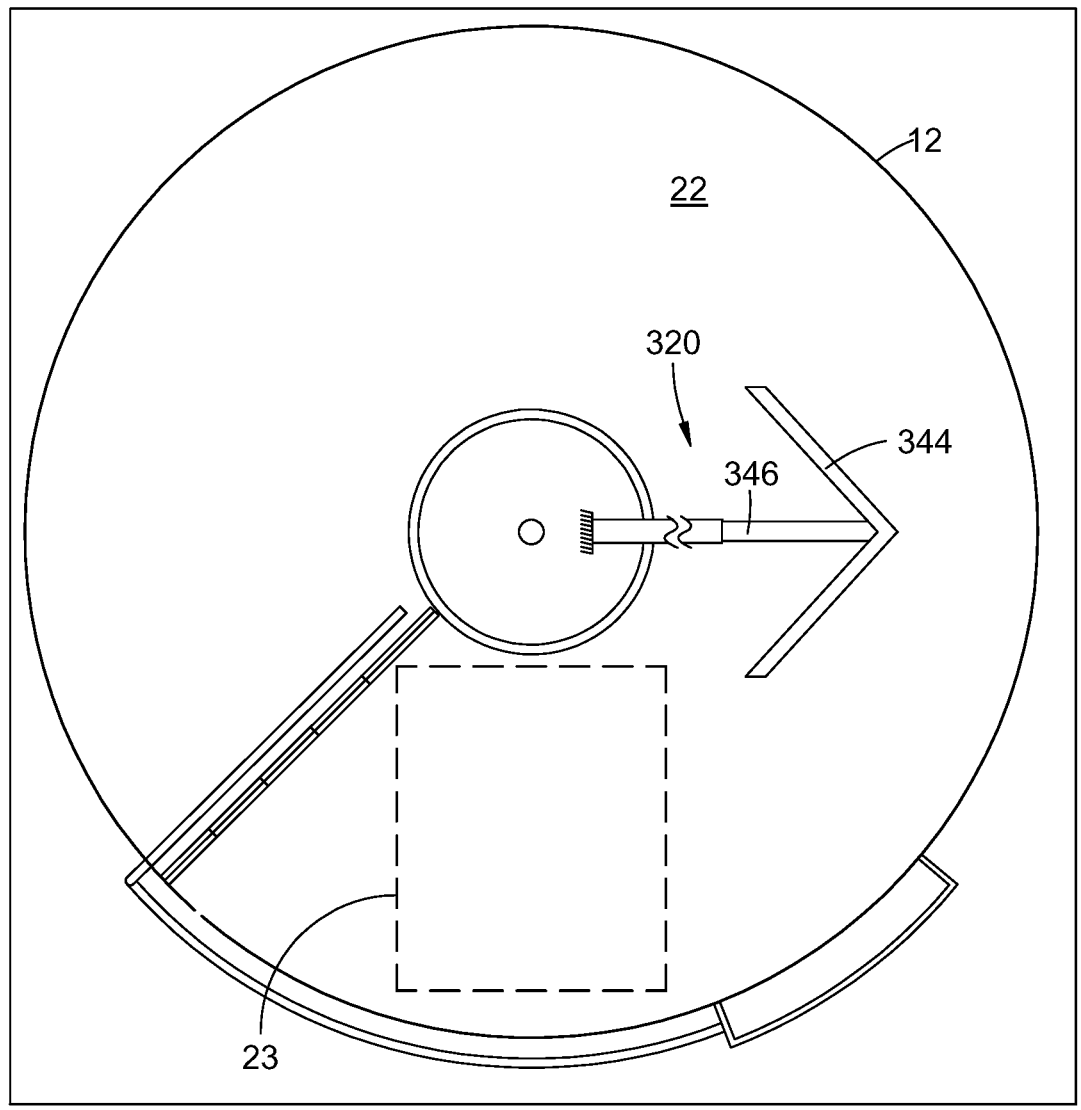
FIG. 9 is a schematic top plan view of another alternative material remover.

To carry out this step, a material remover may be provided which is not dependent upon movement of the build table 12. For example, the material remover 120 described above and shown in FIG. 5 could be used. As an alternative, FIG. 9 illustrates a material remover 320 comprising a blade 344 resting on the build surface 22 of the build table 12 and oriented for movement in a radial direction. An actuator 346 is provided to provide alternate retraction and extension along the axis of the arrow in the figure. This movement would be used to scrape uncured resin and other remnants from the inner radius of the build table 12 to the outer radius and then off into the trough as described above.

Figure 11:
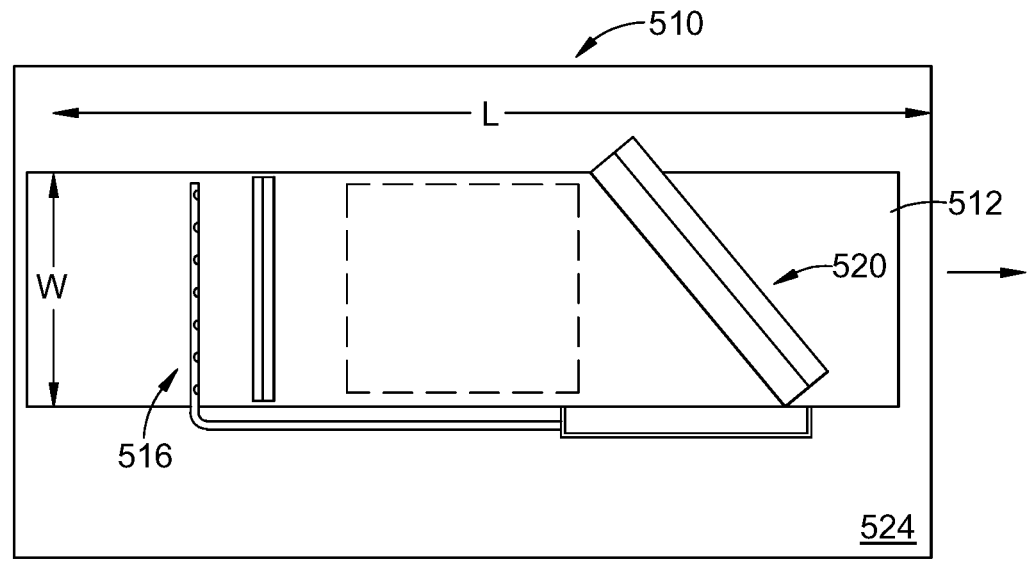
FIG. 11 is a schematic top plan view of the apparatus of FIG. 10.
Figure 10:
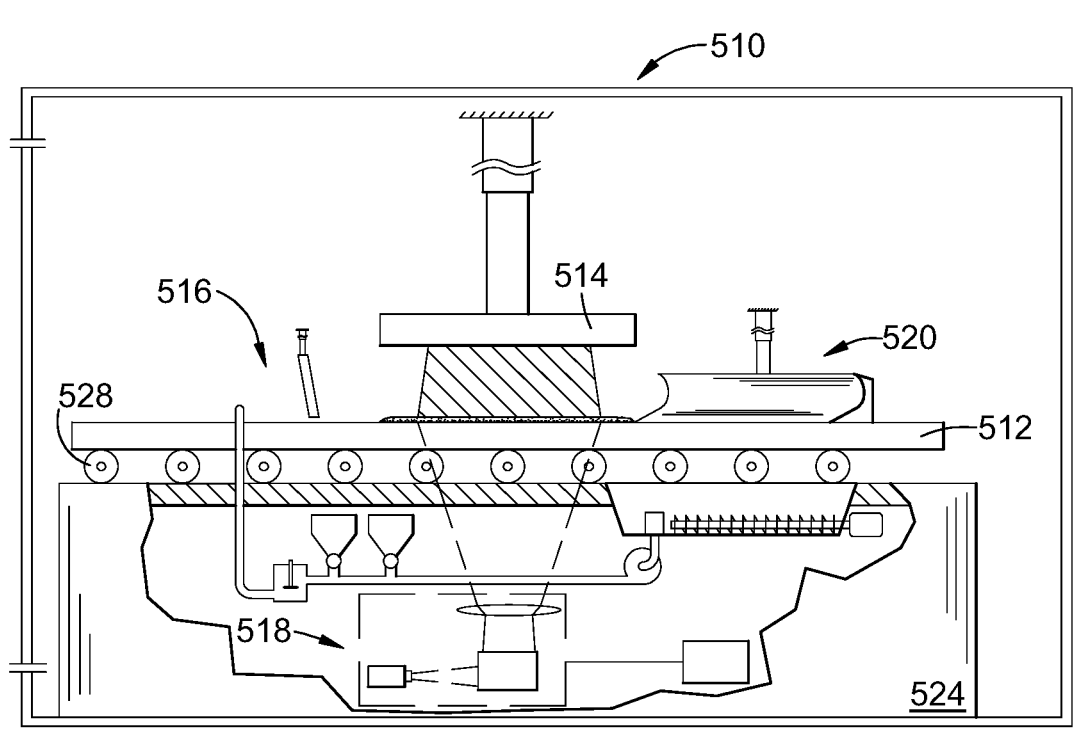
FIG. 10 is schematic side elevation view of an alternative additive manufacturing apparatus.

FIGS. 10 and 11 illustrate schematically an alternative additive manufacturing apparatus 510. The apparatus 510 is similar in overall construction to the apparatus 10 described above. Elements not separately described may be considered to be identical to the apparatus 10. The apparatus 510 includes a build table 512, a stage 514, a material applicator 516, a radiant energy apparatus 518, and a material remover 520.

The structure and operation of the apparatus 510 are substantially similar to the apparatus 10 described above, with the primary difference being that the movement used to advance the build table 512 between build cycles is linear rather than rotational.

As illustrated, the build table 512 is generally rectangular. Other shapes defined by lines, curves and/or polygons may be used. Furthermore, these shapes may include non-uniform features such as a varying width, or the inclusion of features (notches, slots, grooves, etc.) to facilitate locating or actuating the build table 12. The overall width "W" and the overall length "L" may be selected to suit a particular application. Means are provided for moving the build table 512 along a predetermined path such as line or an open curve (either of these may be considered an "open path" as opposed to a "closed path"). In the illustrated example, the build table 512 is supported on a base 524 by a plurality of support rollers 528. One or more of the support rollers 528 may be motorized. Other mounting and drive systems are possible. The drive system is operable to move the build table 512 through the apparatus, for example from left to right as shown by the arrow in FIG. 10.

Other than the table advance motion, operation of the apparatus 510 to build a component 75 is substantially the same as for the apparatus 10 described above. In particular, any or all of the options for applying material and/or removing material as described above may be implemented in the apparatus 510. That is, material application and/or material removal may be linked to movement of the build table 512, or may be independent of it.

Various options are available for handling of the build table 512. For example, when the build table 512 has been advanced through several cycles and reached a limit of how far it can be advanced through the apparatus 510, it could be removed, cleaned or otherwise rejuvenated, and replaced back into the apparatus 510 for further use. Alternatively, a plurality of build tables 512 could be provided. When each build table 512 is completely used, it could be removed and replaced with a clean build table 512. The used build tables could then be cleaned or otherwise rejuvenated and placed back into rotation for further use.

Alternatively, when the build table has reached a limit of how far it can be advanced through the apparatus 510, the material applicator 516 and the material remover 520 could be disengaged and the build table 512 could be moved in a reverse direction to reset it back to an initial position, readying it for further use.

The method and apparatus described herein has several advantages over the prior art. In particular, it eliminates a major pathway for build failures in vat-based photopolymerization. It also potentially has lower cost, less material waste, and higher process speed compared to prior art tape casting methods.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An additive manufacturing apparatus, comprising:
a build table, at least a portion of which is transparent, the build table defining a build surface;
a material applicator operable to deposit a radio-energy-curable resin on a clean portion of the build surface;
a stage positioned facing the build surface of the build table and configured to hold a stacked arrangement of one or more cured layers of the resin;
one or more actuators operable to change the relative positions of the build table and the stage;
a radiant energy apparatus positioned adjacent to the build table opposite to the stage, and operable to generate and project radiant energy on the resin through the build table in a predetermined pattern;
a drive mechanism operable to move the build table so as to expose a new clean portion thereof for each layer; and
a material remover operable to remove remnants from the build surface.

2. The apparatus of claim 1 wherein:
the build table is mounted for rotation about a central axis; and
the drive mechanism is configured to selectively rotate the build table about the central axis.

3. The apparatus of claim 1 wherein the drive mechanism is configured to produce movement of the build table along an open path.

4. The apparatus of claim 1 wherein the material applicator is configured for operation which is physically linked to movement of the build table.

5. The apparatus of claim 1 wherein the material remover is configured for operation physically linked to movement of the build table.

6. The apparatus of claim 1 wherein a trough for collecting excess resin is positioned adjacent the build table.

7. The apparatus of claim 6 further comprising a material circulating apparatus operable to move uncured resin from the trough to the material applicator.

8. The apparatus of claim 1 where the material applicator is configured to selectively deposit more than one resin.

9. The apparatus of claim 1 wherein the build surface includes a non-stick coating.

10. The apparatus of claim 1 wherein at least a portion of the build surface is oxygen-permeable.

11. The apparatus of claim 1, wherein the material remover is operable to move independently from movement of the build table.

12. The apparatus of claim 1, wherein the material remover comprises a rotatable drum having a plurality of scrapers positioned to engage the build surface.

13. An additive manufacturing apparatus, comprising:
a build table mounted for rotation about a central axis, wherein at least a portion of the build table is transparent, and the build table defines a build surface;
a drive mechanism configured to selectively rotate the build table about the central axis;
a material applicator operable to deposit a radio-energy-curable resin on a clean portion of the build surface;
a stage positioned facing the build surface of the build table and configured to hold a stacked arrangement of one or more cured layers of the resin;
one or more actuators operable to change the relative positions of the build table and the stage;
a radiant energy apparatus positioned adjacent to the build table opposite to the stage, and operable to generate and project radiant energy on the resin through the build table in a predetermined pattern; and
a material remover operable to remove remnants from the build surface,
wherein the drive mechanism is operable to move the build table so as to expose a new clean portion thereof for each layer.

14. The apparatus of claim 13 wherein the build table is circular or ring-shaped.

15. The apparatus of claim 13 wherein the material applicator is configured for operation which is physically linked to movement of the build table.

16. The apparatus of claim 15 wherein the material applicator comprises a recoater operable to level a layer of the resin.

17. The apparatus of claim 13 wherein the material remover is configured for operation physically linked to movement of the build table.

18. The apparatus of claim 17 wherein the material remover comprises a scraper positioned to engage the build surface.

19. The apparatus of claim 16, wherein the recoater comprises a plurality of individual side-by-side sections operable to level a layer of the resin.

* * * * *